E. THOMSON.
ELECTRICAL WELDING OF SHEET METAL.
APPLICATION FILED OCT. 21, 1909.
973,586.
Patented Oct. 25, 1910.
Fig. 1.
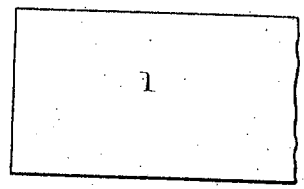
Fig. 2.
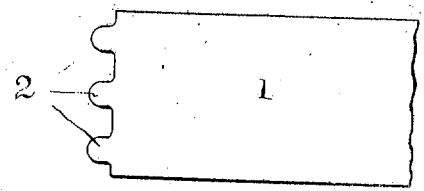
Fig. 3.
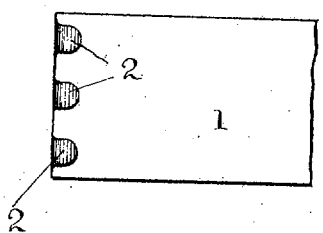
Fig. 4.
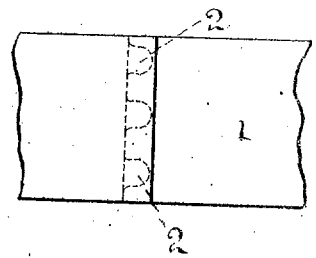
Fig. 5.
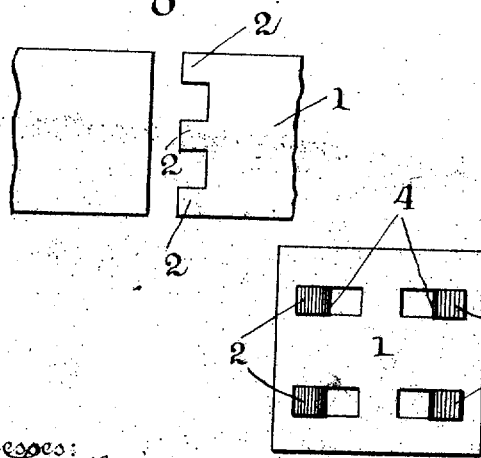
Fig. 6.
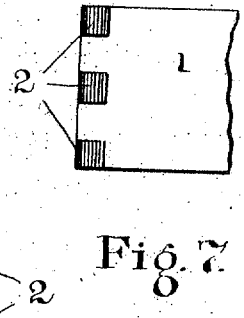
Fig. 7.
Witnesses:
Irene Lefkowitz
Edward M Jellinek
Inventor
Elihu Thomson
By his Attorneys
Townsend & Decker

UNITED STATES PATENT OFFICE.

ELIHU THOMSON, OF SWAMPSCOTT, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

ELECTRICAL WELDING OF SHEET METAL.

973,586. Specification of Letters Patent. Patented Oct. 25, 1910.

Application filed October 21, 1909. Serial No. 523,765.

*To all whom it may concern:*

Be it known that I, ELIHU THOMSON, a citizen of the United States, and a resident of Swampscott, in the county of Essex and State of Massachusetts, have invented certain new and useful Improvements in Electrical Welding of Sheet Metal, of which the following is a specification.

My invention relates to that class of metal work in which plates or sheets of metal are united on their opposed faces by one or more isolated spots of welded union as described in the patent to A. F. Rietzel, No. 928,701.

My invention refers more particularly to that special form of the invention in which a piece of metal is interposed between the sheets or plates at each spot of desired union to produce the desired localized electrical heating and pressure.

My present invention consists substantially in the use of tongues or teeth formed from the body of the sheet metal piece or pieces to be united and turned back upon the plane of the sheet so that when the sheets or plates are superposed each of said tongues or teeth will, by its interposition, serve as if it were a separate piece interposed in the manner described in the aforesaid patent. In carrying out my invention, the said tongues or teeth may be formed in the edge of one or both of the plates or sheets when they are to be united face to face by a mere lapping at their edges or each said tongue or tooth may be formed wholly within the outside boundaries of the sheet by partially cutting a hole therein and folding back the partially cut-out piece or tongue upon the plane of the metal sheet.

In the accompanying drawings, Figure 1 shows one of two sheets of metal to be united prior to the formation of the tongues or teeth therein. Fig. 2 shows the same at the first stage of its preparation by cutting out the edge to form projecting teeth or tongues and Fig. 3 shows said teeth or tongues folded back upon the body of the sheet. Fig. 4 shows said prepared sheet and another sheet lapped upon it for electrical welding of the two sheets or plates together at spots of isolated welded union coincident with the welding teeth or tongues. Fig. 5 shows a modification in the form of said teeth or tongues preparatory to being folded back upon the body of the sheet to form separate pieces as shown in Fig. 6. Fig. 7 shows a sheet as prepared with folded back tongues located entirely within the boundaries of the sheet and adapting the same for being welded to another sheet or plate of the same or different size superposed upon it.

Referring to Fig. 1, I show a rectangular sheet or plate whose edge may be cut out by a stamp to form tongues or projections 2, shown in Fig. 2. After the formation of these tongues the same are laid or folded back upon the body of the sheet as shown in Fig. 3. When another sheet is overlapped upon the sheet Fig. 3 and as shown in Fig. 4, the said tongues 2 will form the separating projections whereby the points of welding are localized upon the application of an electric current and pressure after the manner described in the aforementioned patent.

In Figs. 2 and 3 the teeth are shown as formed entirely within the side edges of the plate, but some of them might be formed at the edges as shown in Fig. 5 and they might be square-ended, as illustrated in said figure and in Fig. 6, or as will be obvious, might be of any other desired form.

In Fig. 7 I show the tongues or teeth as formed entirely within the boundaries of the plate 1. In this case cuts may be formed in the plate excepting along the line 4, and the metal tongues so formed bent back along the line 4 upon the surface of the sheet. Another sheet being superposed upon the sheet 1, the bent back tongues 2 serve in a manner already described to localize the heating and pressure when the sheets are pressed together between the electrodes of an electric welding machine, as well understood in the art.

What I claim as my invention is:

1. The method of welding two sheets of metal together consisting in forming a tongue or tongues in the body of a sheet, bending the tongue back upon the surface to be united, superposing the sheets and applying an electric heating current and pressure, as and for the purpose described.

2. The method of uniting two sheets of metal at one or more isolated spots of union consisting in providing a sheet with a tongue or tongues cut from the body of a sheet and bent over on the surface thereof, placing another sheet over the same and applying heating electric current and pressure, as and for the purpose described.

Signed at Lynn in the county of Essex and State of Massachusetts this 19th day of October A. D. 1909.

ELIHU THOMSON.

Witnesses:
JOHN A. McMANUS, Jr.,
ROBERT SHAND.